Patented Nov. 18, 1930

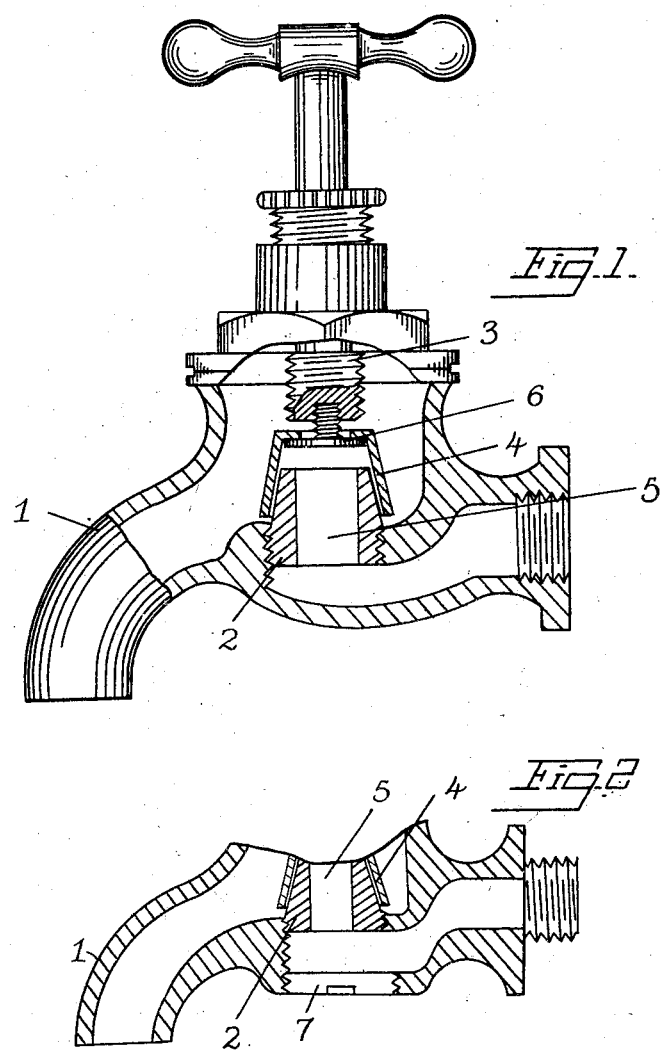

1,782,315

UNITED STATES PATENT OFFICE

JOHN POWELL, OF SALOP, ENGLAND

WATER TAP

Application filed November 14, 1928, Serial No. 319,303, and in Great Britain February 24, 1928.

The invention relates to a tap suitable for either hot or cold water or for high or low pressure, which is formed without a washer and will not leak.

According to the invention instead of using in a water tap a washer at the end of the valve spindle I replace the washer by a thimble secured to the end of said screw spindle and adapted to co-act with a conical nipple taking the place of the usual valve seat.

The nipple can be cast in the body of the tap or screwed therein and is bored for the passage of the water.

In this manner I obtain an improved tap which is equally simple to produce as ordinary existing taps and has the advantage of requiring no renewal of washers yet keeps tight.

In a simple form of construction of the improved tap, shown in the accompanying drawing and wherein Fig. 1 is a part sectional elevation and Fig. 2 a modification, I have provided the tap 1 with a screwed in nipple 2 of conical or tapered shape serving to replace the ordinary valve seat. The end of the screw spindle 3 is adapted to swivelly carry a thimble 4 which is held secure thereto but is preferably independent of the rotation of the spindle 3 when the latter is being screwed up or down and so obviate wear taking place between the said thimble 4 and the co-acting cone-shaped nipple 2. The thimble 4 will of course be raised or lowered as the spindle 3 is raised or lowered and will open or close the passage 5 for the water. In the form of construction illustrated the end of the spindle 3 is provided with a screw-threaded bore adapted to receive a headed screw 6 which serves to carry the thimble 4 leaving a suitable or appropriate gap between the upper part thereof and the bottom edge of the screw spindle. In other words the thimble 4 sits freely on the headed screw 6 so as to be independent of the rotation of the spindle in its up and down movement and not rotate therewith which would cause wear between the two co-acting parts.

However the thimble may be otherwise secured to the spindle and may rotate therewith if desired without exceeding the scope of the present invention. The nipple 2 may be screwed in from below as at Fig. 2 and the opening in the tap body closed by a plug 7.

I claim:

1. In a water tap, in combination, a screw spindle, a thimble, a headed screw for mounting said thimble on said spindle independently of the rotation thereof the head of said screw being located within the thimble, a tapped hole in the end of said spindle for receiving said screw, a nipple screwed into the tap body, and an aperture in said nipple, said thimble being adapted for opening and closing said aperture.

2. In a water tap, in combination, a screw spindle, a thimble, a headed screw for mounting said thimble upon the end of said spindle independently of the rotation thereof, a valve seat, said thimble being adapted to be raised and lowered for opening and closing the opening through said seat, a tapped aperture in the bottom of the tap body, a nipple adapted for screwing upwardly through said aperture and a plug for closing said aperture.

JOHN POWELL.